United States Patent [19]

Salokangas

[11] Patent Number: 4,693,816
[45] Date of Patent: Sep. 15, 1987

[54] BIOLOGICAL FILTER HEATING ARRANGEMENT FOR TREATMENT OF WASTE WATER

[75] Inventor: Arto Salokangas, Lahti, Finland
[73] Assignee: Oy Ekofinn Ab, Finland
[21] Appl. No.: 832,585
[22] Filed: Feb. 24, 1986

[30] Foreign Application Priority Data

Feb. 22, 1985 [FI] Finland ................................ 850738

[51] Int. Cl.⁴ .............................................. C02F 3/06
[52] U.S. Cl. .................................. 210/150; 210/177; 210/180; 210/185
[58] Field of Search ............... 210/603, 612, 177, 180, 210/184–186, 150, 151

[56] References Cited

U.S. PATENT DOCUMENTS

| | | | |
|---|---|---|---|
| 3,892,660 | 7/1975 | Romell | 210/612 X |
| 4,000,064 | 12/1976 | Romell et al. | 210/612 X |
| 4,196,082 | 4/1980 | Salokongas et al. | 210/180 |
| 4,486,310 | 12/1984 | Thornton | 210/612 X |

Primary Examiner—Tom Wyse
Attorney, Agent, or Firm—Lowe Price LeBlanc Becker & Shur

[57] ABSTRACT

The invention concerns a heating arrangement for ambient air introduced into a biological filter intended for the treatment of waste waters. The arrangement comprises intake openings for outside air, a member for heating the outside air, a blower, for blowing the heated air through the filter material layer, as well as air exhaust openings. According to the invention, the said heating member comprises a heat exchanger fitted as operative between the intake openings and the blower, the warmer side of the said heat exchanger being in contact with the waste water flowing in the filter, whereby the outdoor air is heated by the effect of the quantity of heat transferred from the waste water. The heat exchanger preferably consists of a hose made of aluminium, which hose interconnects the intake openings and the blower and which is fitted so that it is at least partly immersed in the waste water flowing in the filter. An opening has further been formed into the hose, which opening is in connection with the air exhaust openings. In this way, some of the heated air that passed through the filter layer can be recirculated, whereby the requirement of fresh, cold outdoor air becomes lower.

5 Claims, 1 Drawing Figure

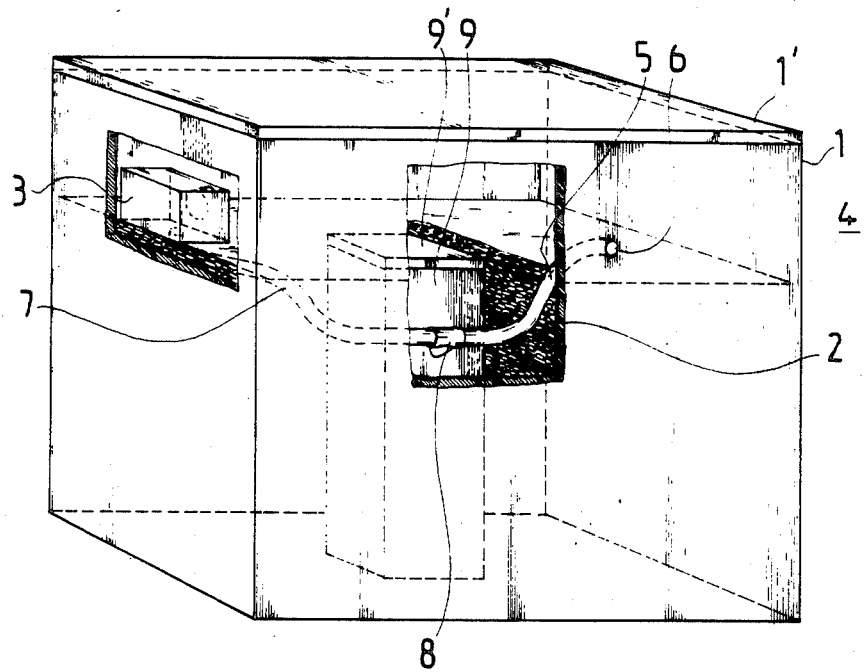

BIOLOGICAL FILTER HEATING ARRANGEMENT FOR TREATMENT OF WASTE WATER

The present invention concerns an arrangement for heating of ambient air introduced into a biological filter used in the treatment of waste waters. In such an arrangement, the waste water or sewage is aerated by means of the ambient air introduced into the filter. The arrangement usually comprises an intake opening for the outside air, members for heating the outside air, a blower, and air exhaust openings.

Several different biological filters or biofilters are known. It is a common feature of all of the solutions that, in order to be operative, the population of bacteria that is present in the filter and that decomposes the impurities in the waste waters requires a constant supply of fresh air and a suitable ambient temperature. Generally, the temperature of the sewage is approximately constant, 7-14° C., and thus sufficient for maintaining a fully acceptable biological degradation process. However, during the cold season, due to the low temperature of the air entering the biological filter, the temperature of the sewage may drop to or below 0° C. In order to control the supply of fresh air and to provide a suitable ambient temperature at the same time, recently a solution has become common in which the filter material proper, i.e. the filler material made of plastic or similar material, is heated by means of preheated air. In such a case, the filter is placed in a closed container. In the upper or lower part of the container, ventilation openings have been formed, through which air flows freely or is sucked by means of a blower. The air exhausted through openings placed at the opposite side of the container. During the cold season, the air is heated, e.g. by means of an electric resistor. In this context, reference is made to the solutions desribed in the GB Patent Specification No. 1 234 807 and the U.S. Pat. No. 4,486,310.

The relatively high temperature (e.g. 25°–50° C.) of the decay processes based on activated sludge has also been used for heating ambient air. U.S. Pat. No. 3,892,660 and DE Patent Application No. 1 904 207 both describe methods in which supplied air is brought to an elevated temperature in a heat exchanger by heat generated in a decay process.

On the other hand, it has been suggested in the prior art to heat the seqage. GB Patent Specification No. 1 482 625 anticipates a active sludge process for treating aqueous material having a biochemical oxygen demand wherein the temperature of said aqueous material in the vessel is controlled by means of heat exchange with a stream of aqueous material from the treatment tank.

Thus, in the above solutions to prevent the freezing of the filter, the provision of external energy, either electric energy or heat supplied by means of heat exchange with air or effluents from other processes, has been required.

It is an object of the present invention to provide a simple solution of an entirely novel sort for heating the air blown through the biofilter. The invention is based on the idea that, for the purpose of heating the outdoor air coming through the ventilation openings, the air is passed through a heat exchanger whose warmer side is in contact with the waste water flowing within the filter. Thus, the intake air is heated by making use of the heat content in the waste water itself. No external energy is provided to increase the quantity of heat in the system. The surface of the sewage, which normally is most apt to freeze, is now aerated by air of a temperature well above the ambient temperature. The temperature of the air circulated by the blower may even be about the same as that of the sewage. Accordingly, a suitable environment for the bacterial population is achieved by simply distributing the total quantity of heat of the sewage and the entering outdoor air more evenly throughout the biofilter.

In the invention, it is possible to use any conventional heat exchanger whatsoever, such as a tubular or plate heat exchanger. The inlet opening of the cold side of the exchanger is connected via a pipe or hose with the air intake openings, and the exhaust opening in a corresponding way with the blower placed in the container. The waste water is either allowed to flow freely at the warm side of the heat exchanger, or it is brought into a forced circulation by means of a pump.

In a preferred embodiment of the invention, the heat exchanger comprises a pipe made of a heat-conductive material, which is connected to the intake opening and to the blower by its ends. The pipe is fitted so that it passes, i.e. it is immersed at least partly in the waste water flowing in the filter. As such a pipe, preferably a spiral pipe made of aluminium is used. As regards its construction, said pipe is flexible, and therefore, out of it, several loops present in the waste water flow are readily produced, whereby the heat transfer area becomes quite large.

Besides aluminium, it is also conceivable to use other heat-conductive materials for the manufacture of the pipe or hose, such as metals or alloys durable in waste water. The pipe or hose may also be made of some ordinary basic material of poor heat conductivity, wherein heat-conductive portions, such as metal pipes, are fitted at regular intervals.

As a particular feature related to the invention should be mentioned the possibility of recirculation of the heated air, which can be accomplished by means of the invention very easily. An opening is formed into the hose or pipe functioning as the heat exchanger, which said opening is in connection with the air exhaust openings. In this way, part of the heating air that has passed through the filter layer may be combined with the fresh supply of air and passed again through the blower into the filter layer. By selecting the size of the opening appropriately, an optimal recirculation ratio is readily achieved.

The invention, and in particular its preferred embodiment involves several advantages. The most important ones of them are the following:
external thermal energy is not required, one electric component, the heating resistor, can be omitted,
when the air is recirculated, new cold outdoor air has to be sucked into the system as a smaller quantity, and
no moving components are needed in the system.

The invention will now be examined in the following example in more detail with the aid of the accompanying drawing, which is an illustrastion of principle of the mode of accomplishing the heating arrangement in accordance with the invention.

The container part of the biofilter comprises a mantle 1, which is provided with a sealed roof 1'. Inside the container the biofilter material 2 proper is placed, as well as, in its immediate proximity, a blower 3. To the suction side of the blower, a hose 5 is attached, whose opposite end is connected to the intake opening 6. The air coming from outside 4 is sucked along the hose 5 into the blower 3, from which it is blown further through the biofilter filler material 2, being removed through the exhaust openings (not shown) formed in the bottom of the container part, to the outside air or into the sewer.

The hose 5 is made of aluminium and fitted, in the way shown in the figure, underneath the surface of the waste water. The intake air becomes warm by the effect of the conveyance of heat taking place out of the waste water through the wall 7 of the hase. In the hase 5, a T-branch piece is fitted, whose opening 8 that opens itself to the side is connected with the space 9. This space 9, i.e. the central pipe of the filter, which is provided with a cover 9' and which is preferably gas-tight, is again, in a way not shown, connected with the air exhaust openings. Some of the air that has become warm in the hose 5 and that has passed through the biofilter is returned through the space 9 and the T-branch to the air circulation. A recirculation ratio between two and three has provied advantageous in practice. If the outdoor air is warmer that the waste water (this may often be the case in the summer), some of the moisture contained therein condesnses. In view of such an occurrence, the hose 5 should preferably be placed in the container such that the T-piece is located as low in vertical direction as possible. Thereby the condensate water flows out through the space 9.

Within the scope of the invention, it is also possible to think of solutions differing from the exemplifying embodiment described above. Thus, besides a solution based exclusively on the heat content in the waste water, a heating arrangement may also be concerned that is also provided with a thermistor-controlled heating resistor. In such a case, the said resistor is switched on only if the temperature of the blowing air does not become sufficiently high by means of the heat transfer alone.

What is claimed is

1. A heating arrangement for outdoor air introduced into a biological filter intended for the treatment of waste waters, said biological filter comprising:
   intake openings for the outdoor air;
   a heat exchanger means mounted within the filter and connected to the intake openings for heating the outdoor air;
   a blower connected to the heat exchanger means for blowing the heated air through a layer of filter material contained within the filter; and
   exhaust openings for the air,
   wherein said heat exchanger means includes a heat exchanger installed between the intake openings and the blower, the warmer side of said heat exchanger being in direct contact with the waste water flowing in the filter, whereby the outdoor air within the heat exchanger is heated directly by heat transferred thereto from the waste water.

2. An arrangement as claimed in claim 1, wherein the heat exchanger includes a hose made of a heat-conductive material, said hose interconnecting the intake openings to the blower and being fitted such that it passes at least partly in the waste water flowing in the filter.

3. An arrangement as claimed in claim 2, wherein the hose is made of aluminium.

4. An arrangement as claimed in claim 1, wherein an opening has been formed into the hose which said opening opens to a space in connection with the air exhaust openings, whereby some of the heated air that has passed through the filter layer may be recirculated.

5. An arrangement as claimed in claim 4, wherein the hose is fitted such that the opening is positioned vertically at the lowest point of the hose, whereby the water condensed from the air is allowed to flow to the space in connection with the air exhaust openings.

* * * * *